United States Patent [19]

Chen

[11] Patent Number: 5,577,152
[45] Date of Patent: Nov. 19, 1996

[54] MOTOR ASSEMBLY

[76] Inventor: Ruey-Zon Chen, No. 261, Jen-Hua Rd., 412 Tai-Li City, Taichung Hsien, Taiwan

[21] Appl. No.: 421,426

[22] Filed: Apr. 12, 1995

[51] Int. Cl.$^6$ ....................................................... H02P 7/29
[52] U.S. Cl. .......................... 388/804; 388/811; 318/138; 318/599
[58] Field of Search .................................... 318/138, 254, 318/439, 430–434, 599–603; 388/800–824; 361/20–43

[56] References Cited

U.S. PATENT DOCUMENTS

| 5,265,590 | 11/1993 | Takagi | 128/33 |
| 5,270,631 | 12/1993 | Takahashi et al. | 318/135 |
| 5,300,866 | 4/1994 | Yasohara et al. | 318/254 |
| 5,327,064 | 7/1994 | Arakawa et al. | 318/801 |
| 5,373,436 | 12/1994 | Yamaguchi et al. | 363/98 |

Primary Examiner—Paul Ip
Attorney, Agent, or Firm—Marshall & Melhorn

[57] ABSTRACT

A motor assembly includes a brushless dc motor and a driving unit. The driving unit includes three first power transistors, each being activable to connect a respective one of three windings of a coil unit of the dc motor and a power supplying circuit. A comparing unit compares a reference voltage signal equal to a desired motor speed from a speed setting unit with an analog voltage signal corresponding to the rotating speed of the rotor from a frequency-to-voltage converter and generates an analog error voltage signal. Each of three second power transistor corresponds to one of the first power transistors and is activable to connect the power supplying circuit and a respective one of the windings of the coil unit. The driving circuit receives and processes from a sensor circuit three speed pulses representing the rotating speed of the rotor so as to activate intermittently two of the first power transistors and deactivate one of the first power transistors at any time and so as to activate one of the second power transistors corresponding to the deactivated one of the first power transistors upon receiving a modulated pulse signal which is generated by a pulse width modulating circuit having the error voltage signal as a modulating signal.

6 Claims, 6 Drawing Sheets 5,577,152

MOTOR ASSEMBLY

BACKGROUND OF THE INVENTION

1. Field of the Invention

This invention relates to a motor assembly, more particularly to a motor assembly which includes a dc motor and a driving unit for driving the dc motor at different speeds.

2. Description of the Related Art

A conventional motor assembly usually includes an induction motor and a variable frequency device. The aforementioned conventional motor assembly has the following disadvantages:

1. The induction motor assembly is relatively large, and the noise that is generated during operation is relatively loud. Furthermore, the cost of the induction motor assembly is relatively high.
2. The variable frequency device varies the current for the induction motor so as to enable the induction motor to rotate at different speeds. However, the torque ratio thus obtained is relatively low. Therefore, the problem of an insufficient torsional force is present when the motor speed is relatively low.
3. The induction motor usually comprises a rotor which includes a rotatable shaft and a plurality of fan-shaped permanent magnets attached to the rotatable shaft by means of adhesives. Therefore, undesired disengagement of the permanent magnets from the rotatable shaft may occur during the rotation of the rotatable shaft. Furthermore, the unique shape of the permanent magnets results in a higher processing cost and complicates the assembling process.

SUMMARY OF THE INVENTION

Therefore, the main objective of the present invention is to provide a motor assembly which includes a brushless dc motor and a driving unit for driving the dc motor at different speeds and which is able to overcome the disadvantages associated with the prior art.

According to the present invention, a motor assembly includes a brushless dc motor and a driving unit for driving the dc motor at different speeds. The motor includes a stator and a rotor. The stator includes a housing and a three-phase coil unit installed in the housing and provided with three windings. The rotor extends through the housing of the stator. The driving unit includes a power supplying circuit for generating a dc output. A first power transistor unit includes three first power transistors. Each of the first power transistors is activable to connect electrically a respective one of the windings of the coil unit and the power supplying circuit. A driving circuit is connected electrically to the power transistors of the first power transistor unit for activating the first power transistor unit when the power supplying circuit is activated. A sensor circuit is used for sensing rotating speed of the rotor and for generating three speed pulses which represent the rotating speed of the rotor and which are out of phase. A frequency-to-voltage converter is connected electrically to the sensor circuit for generating an analog voltage signal corresponding to the rotating speed of the rotor. A speed setting unit is activable to generate a reference voltage signal equal to a desired motor speed. A comparing unit is connected electrically to the speed setting unit and the frequency-to-voltage converter for comparing the reference voltage signal with the analog voltage signal and for generating an analog error voltage signal having a magnitude corresponding to a difference between the analog voltage signal and the reference voltage signal. A pulse width modulating circuit is connected electrically to the comparing unit for generating a variable-width modulated pulse signal with the analog error voltage signal as a modulating signal. A second power transistor unit includes three second power transistors. Each of the second power transistors corresponds to one of the first power transistors and is activable to connect electrically the power supplying circuit and a respective one of the windings of the coil unit. The driving circuit receives the three speed pulses from the sensor circuit and processes the speed pulses so as to activate intermittently the first power transistors such that two of the first power transistors are activated and one of the first power transistors is deactivated at any time. The driving circuit is further connected electrically to the pulse width modulating circuit and the second power transistors for activating one of the second power transistors corresponding to the deactivated one of the first power transistors upon receiving the modulated pulse signal from the pulse width modulating circuit.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
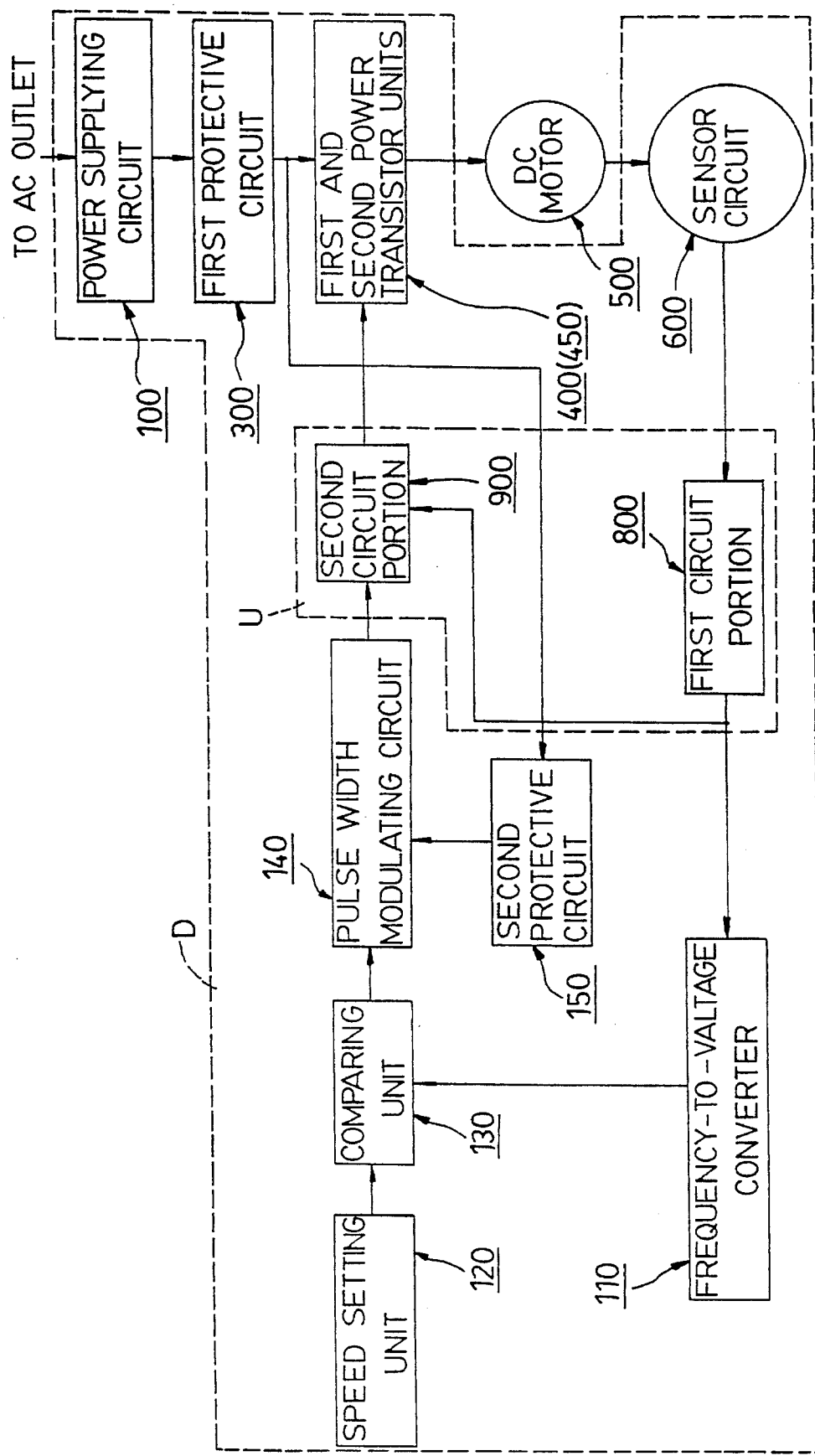
FIG. 1 is a schematic block diagram showing a motor assembly according to the present invention.
Figure 2:
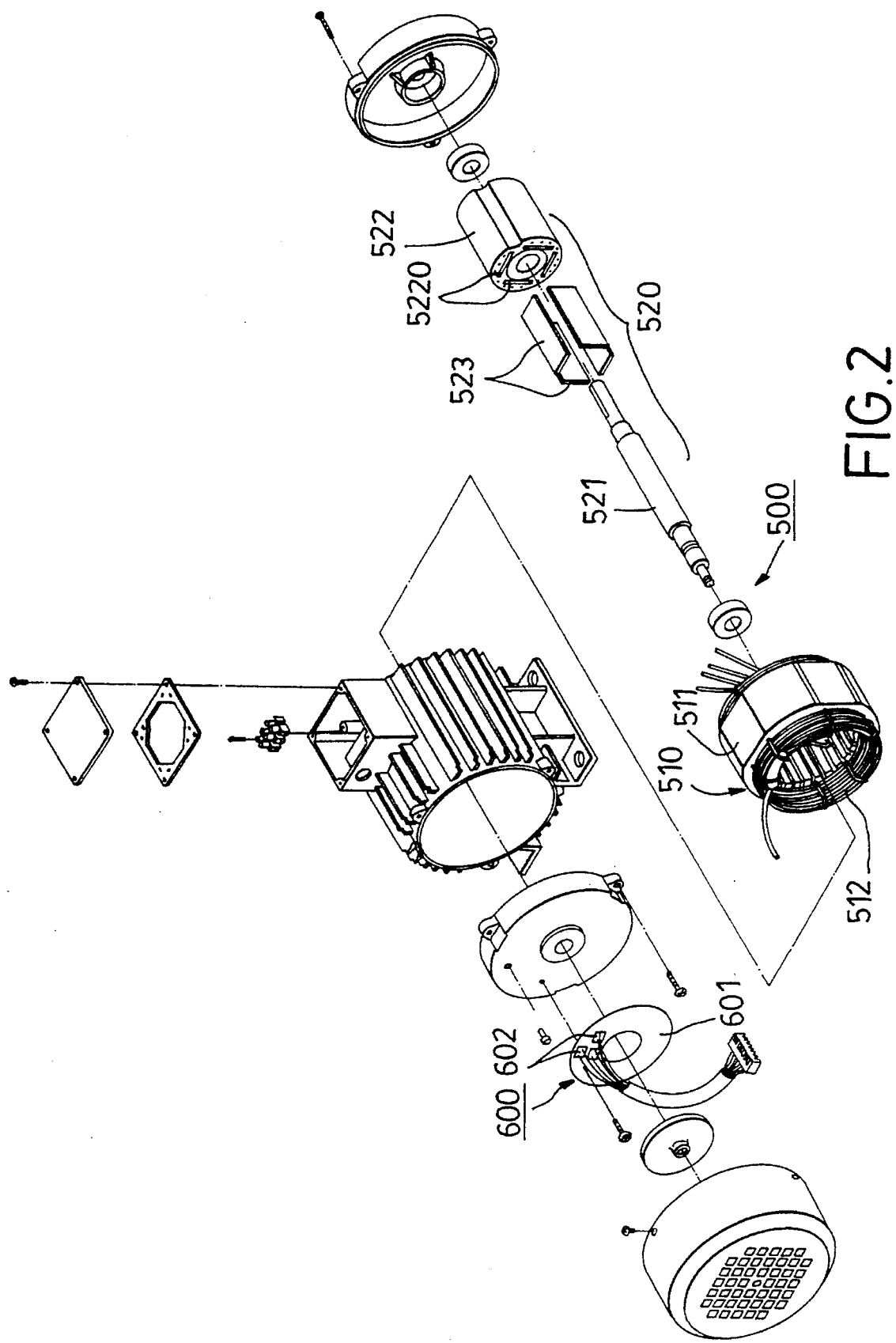
FIG. 2 is a partly exploded view showing a brushless dc motor of the motor assembly according to the present invention.

Referring to FIGS. 1 and 2, a motor assembly according to the present invention includes a brushless dc motor 500 and a driving unit (D) for driving the dc motor 500 at different speeds.

The dc motor 500 includes a stator 510 and a rotor 520. The stator 510 includes a housing 511 and a three-phase coil unit 512 installed in the housing 511 and provided with three windings. The rotor 520 includes a rotatable shaft 521 extending rotatably through the housing 511 of the stator 510, a magnet-mounting member 522 sleeved securely on the rotatable shaft 521 and formed with a plurality of axially extending magnet-receiving cavities 5220 around the rotatable shaft 521, and a plurality of permanent magnets 523 received respectively in the magnet-receiving cavities 5220.

The driving unit (D) includes a power supplying circuit 100, a first protective circuit 300, first and second power transistor units 400 and 450, a sensor circuit 600, a driving circuit (U), a frequency-to-voltage converter 110, a speed setting unit 120, a comparing unit 130, a pulse width modulating circuit 140 and a second protective circuit 150.

Figure 3:
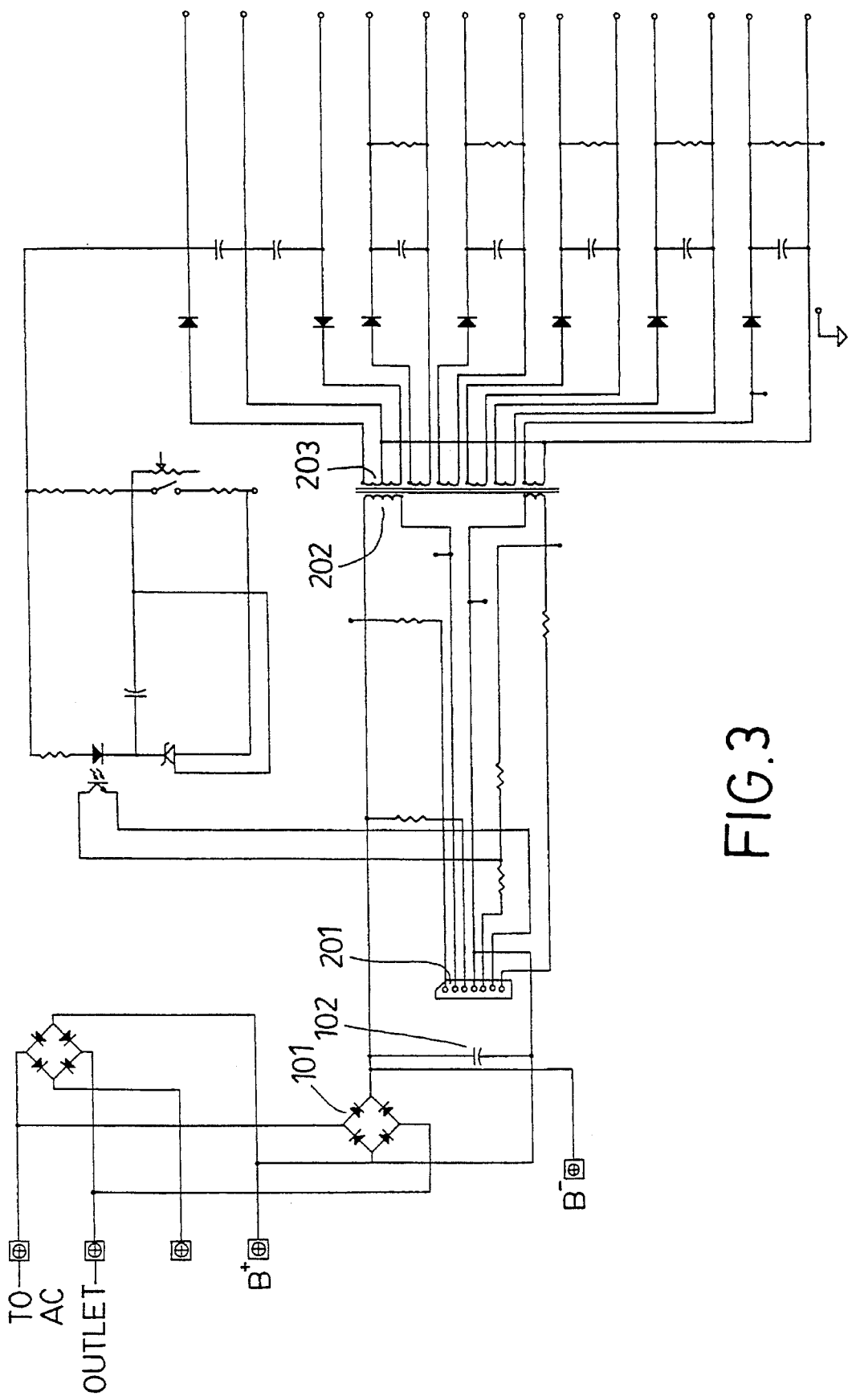
FIGS. 3 to 6 are schematic circuit diagrams of a driving unit of the motor assembly according to the present invention.

Referring now to FIGS. 1 and 3, the power supplying circuit 100 includes two bridge rectifiers 101,103. Each of the rectifiers 101,103 is adapted to be connected to an ac outlet and generates a dc output. The dc output of the rectifier 101 is applied to a transformer 202 via a capacitor 102 and a switching transistor circuitry 201. The transformer 202 supplies dc voltages to a plurality of rectifiers 203 so as to generate a plurality of regulated dc voltage outputs for driving the electronic circuits of the driving unit (D).

Figure 4:
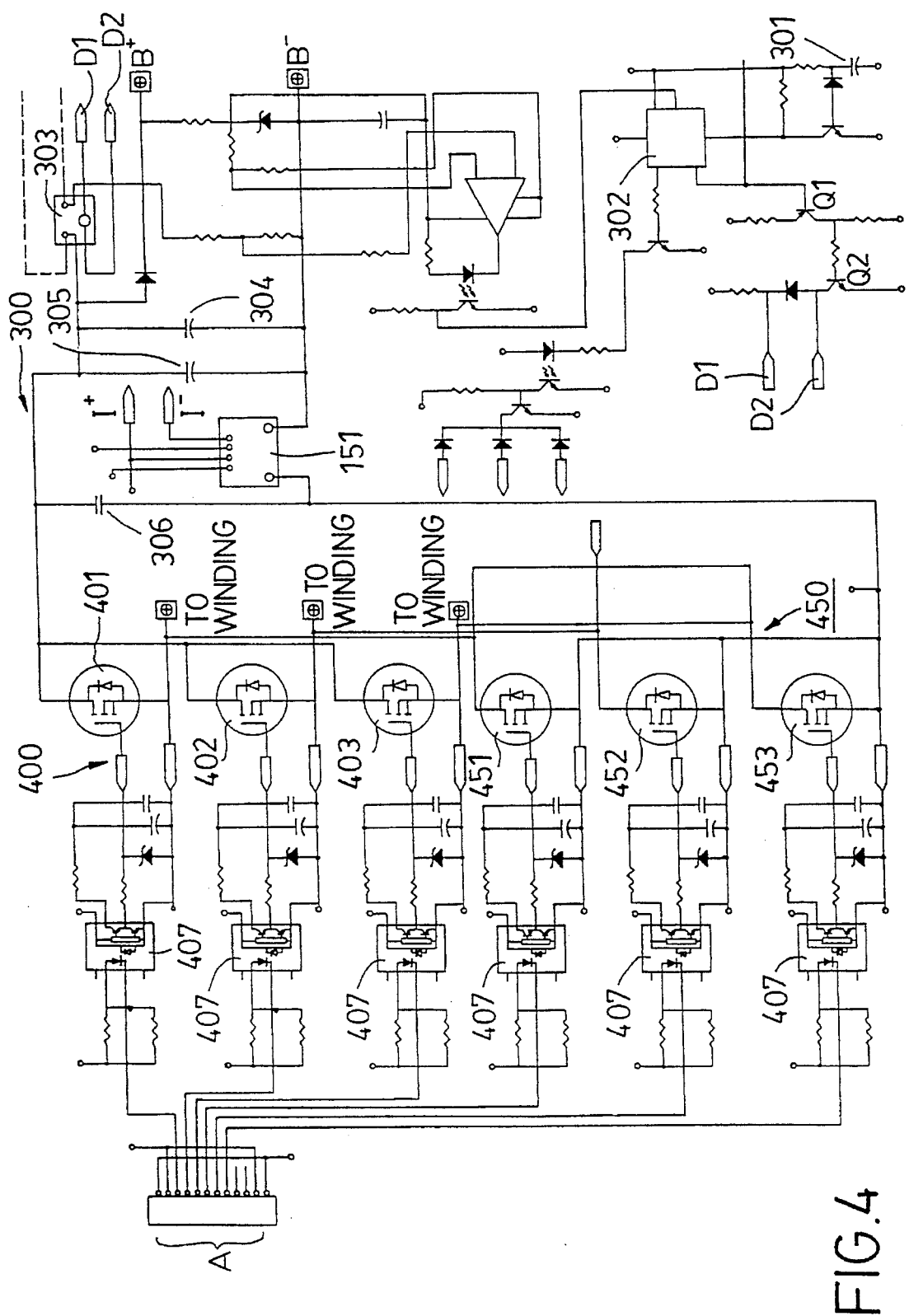

Referring to FIGS. 1, 3 and 4, the first protective circuit 300 includes a capacitor 301 which is connected electrically to and which is charged by one of the regulated dc voltage outputs of the rectifiers 203. A D-type flip-flop 362 is connected electrically to the capacitor 301. A relay unit 303 is connected electrically to the D-type flip-flop 302 via two transistors (Q1 and Q2). Three capacitors 304,305,306 are connected electrically to the relay unit 303 and to the bridge rectifier 103 so as to be charged by the dc output of the bridge rectifier 103 when the relay unit 303 is activated.

The first power transistor unit 400 includes three first power transistors 401,402,403. Each of the first power transistors 401,402,403 has a gate terminal, a drain terminal connected electrically to the capacitors 304,305,306, and a source terminal connected electrically to a respective one of the windings of the coil unit 512.

The second power transistor unit 450 includes three second power transistors 451,452,453. Each of the second power transistors 451,452,453 corresponds to one of the first power transistors 401,402,403 and has a gate terminal, a drain terminal connected electrically to a respective one of the windings of the coil unit 512, and a source terminal connected electrically to the capacitors 304,305,306.

Figure 5:
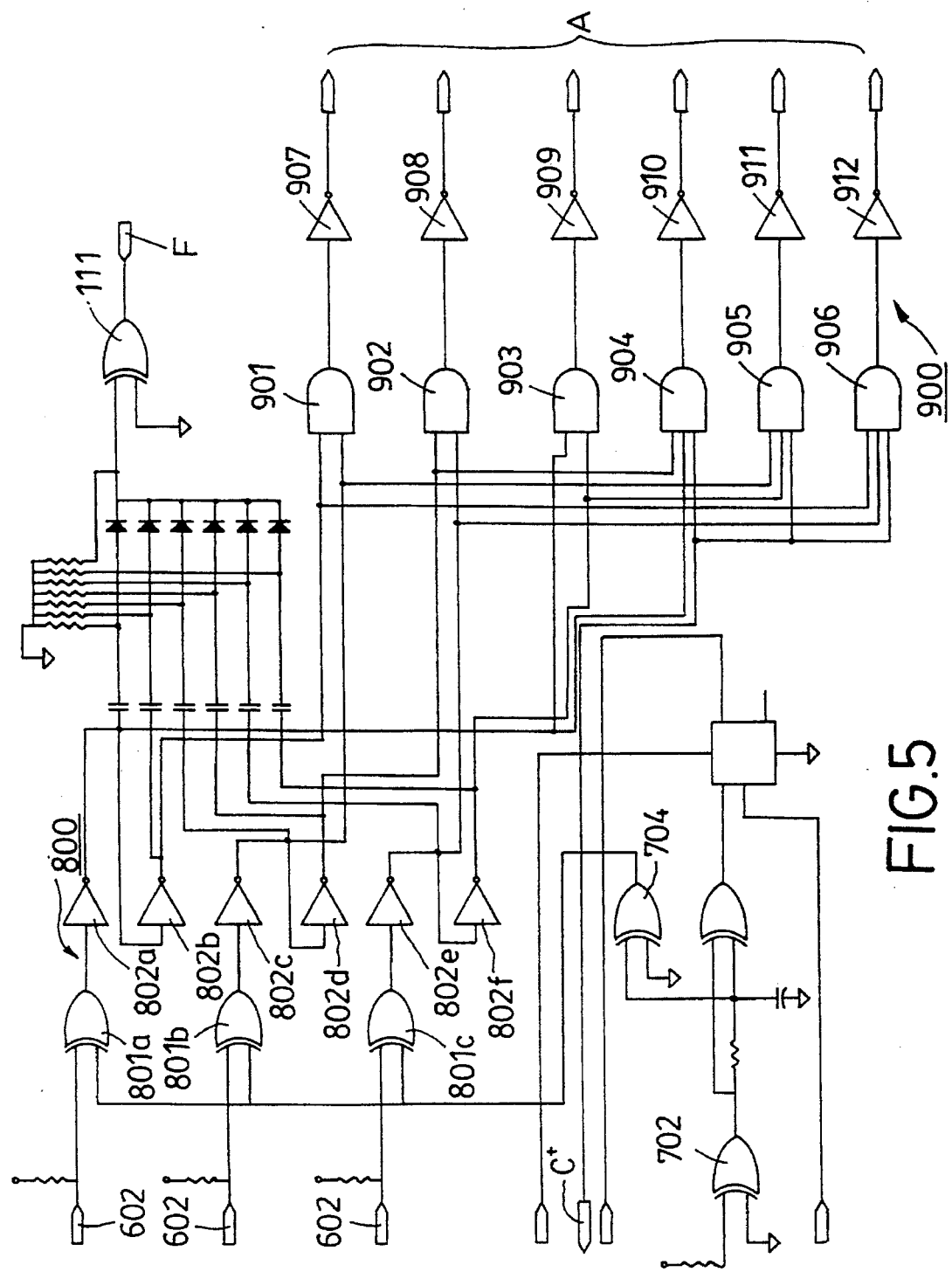

Referring to FIGS. 1, 2 and 5, the sensor circuit 600 includes three angularly displaced Hall sensors 602 which are mounted on a stationary magnetic disk 601 that is provided adjacent to one end of the rotatable shaft 521. In the present embodiment, the angular displacement between two adjacent Hall sensors 602 is approximately 30 degrees.

The driving circuit (U) includes a first circuit portion 800 and a second circuit portion 900. The first circuit portion 800 includes three exclusive-OR gates (801a,801b,801c) and six inverters (802a to 802f). Each of the exclusive-OR gates (801a,801b,801c) has a first input terminal connected electrically to a respective one of the Hall sensors 602 and a second input terminal connected electrically to an output terminal of an exclusive-OR gate 704 which has a first input terminal connected electrically to an output terminal of an exclusive-OR gate 702 and a grounded second input terminal. The exclusive-OR gate 702 has a normally high first input terminal and a grounded second input terminal. It should be appreciated that the first input terminal of the exclusive-OR gate 702 may be grounded if necessary. The inverter (802a) has an input terminal connected electrically to an output terminal of the exclusive-OR gate (801a) and an output terminal. The inverter (802b) has an input terminal connected electrically to the output terminal of the inverter (802a) and an output terminal. The inverter (802c) has an input terminal connected electrically to an output terminal of the exclusive-OR gate (801b) and an output terminal. The inverter (802d) has an input terminal connected electrically to the output terminal of the inverter (802c) and an output terminal. The inverter (802e) has an input terminal connected electrically to an output terminal of the exclusive-OR gate (801c) and an output terminal. The inverter (802f) has an input terminal connected electrically to the output terminal of the inverter (802e) and an output terminal.

The second circuit portion 900 of the driving unit (U) includes six AND gates 901 to 906 and six inverters 907 to 912. The AND gate 901 has a first input terminal connected electrically to the output terminal of the inverter (802b), a second input terminal connected electrically to the output terminal of the inverter (802c), and an output terminal. The AND gate 902 has a first input terminal connected electrically to the output terminal of the inverter (802d), a second input terminal connected electrically to the output terminal of the inverter (802e), and an output terminal. The AND gate 903 has a first input terminal connected electrically to the output terminal of the inverter (802a), a second input terminal connected electrically to the output terminal of the inverter (802f), and an output terminal. The AND gate 904 has a first input terminal connected electrically to the output terminal of the inverter (802d), a second input terminal connected electrically to the output terminal of the inverter (802a), a third input terminal and an output terminal. The AND gate 905 has a first input terminal connected electrically to the output terminal of the inverter (802c), a second input terminal connected electrically to the output terminal of the inverter (802f), a third input terminal and an output terminal. The AND gate 906 has a first input terminal connected electrically to the output terminal of the inverter (802b), a second input terminal connected electrically to the output terminal of the inverter (802e), a third input terminal and an output terminal. Each of the inverters 907 to 912 has an input terminal connected electrically to the output terminal of a respective one of the AND gates 901 to 906, and an output terminal connected electrically to the gate terminal of a respective one of the power transistors 401,402,403 and 451,452,453 via an optical coupler 407.

Figure 6:
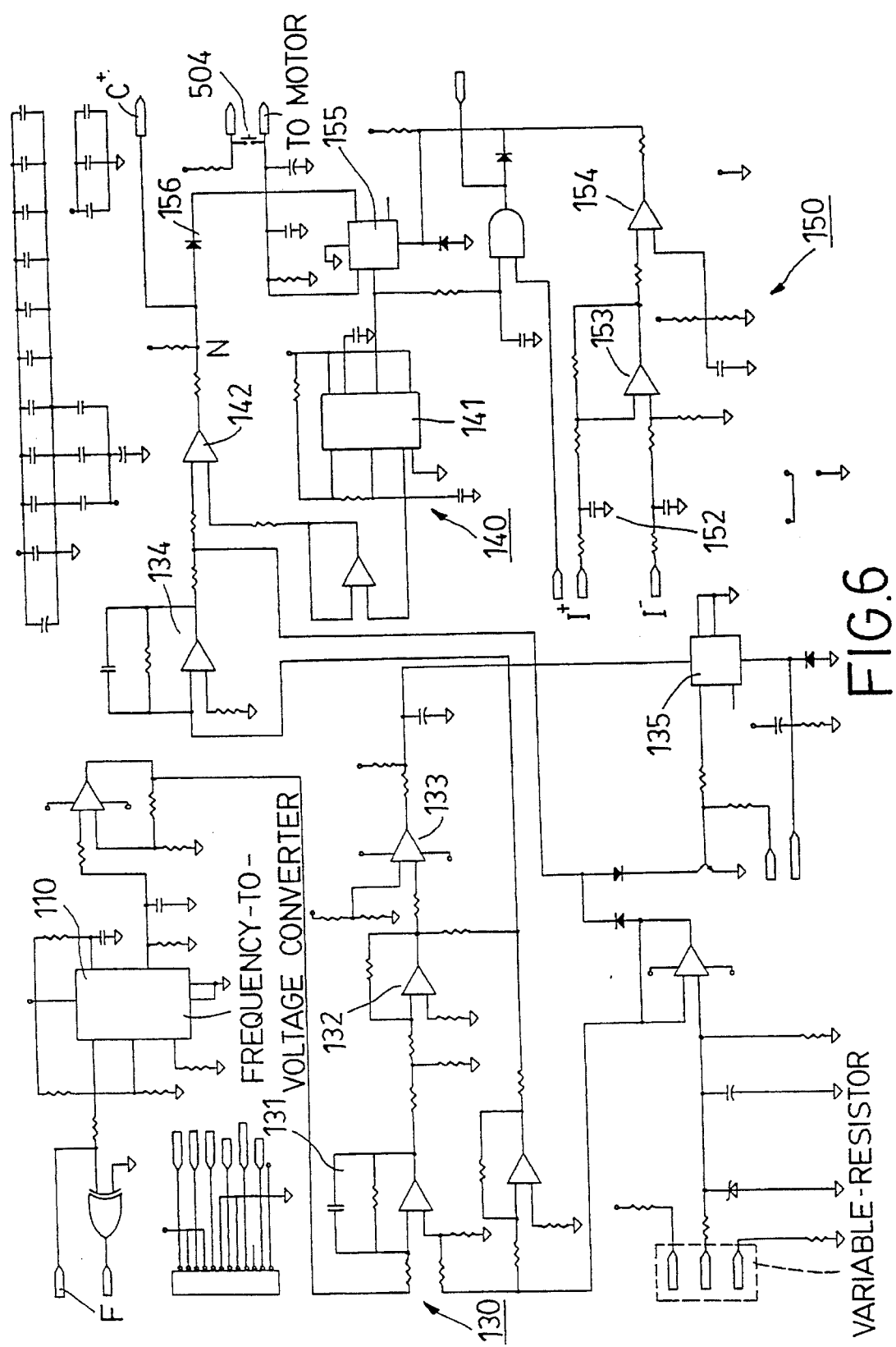

Referring now to FIGS. 1, 5 and 6, the frequency-to-voltage converter 110 has an input terminal connected electrically to an output terminal of an exclusive-OR gate 111 which has a grounded first input terminal and a second input terminal connected electrically to the output terminal of each of the inverters (802a to 802f) via a diode and a capacitor.

The speed setting unit 120 is activable to generate a reference voltage signal equal to a desired motor speed. In the present embodiment, the reference voltage signal is obtained by the adjustment of a variable-resistor.

The comparing unit 130 includes a comparator 131 which has input terminals connected electrically to the speed setting unit 120 and the frequency-to-voltage converter 110. An adder 134 has an input terminal connected electrically to an output terminal of the comparator 131 via a buffer 132 and to the output terminal of the speed setting unit 120.

The pulse width modulating circuit 140 includes a triangular-wave generating integrated circuit 141 which generates a train of triangular-wave voltage signals. A comparator 142 has input terminals connected electrically to an Output terminal of the adder 134 and an output terminal of the integrated circuit 141. The comparator 142 has an output terminal connected electrically to the third input terminal of each of the AND gates 904,905,906 via a node (N).

The second protective circuit 150 includes a current detecting unit and a temperature detecting unit. The current detecting unit includes a current detector 151 (FIG. 4) which is connected electrically to the capacitors 304,305,306 for detecting an amount of load current from the power supplying circuit 100 and which is connected electrically to a comparator 154 via a low pass filter 152 and a nonphase-inverting amplifier 153. The comparator 154 compares the output from the amplifier 153 with a predetermined value and has an output terminal connected electrically to a reset terminal of a D-type flip-flop 155. The flip-flop 155 has an output terminal connected electrically to the output terminal of the comparator 142 via a diode 156. The temperature detecting unit is used for detecting temperature of the dc motor 500 and includes a thermal switch 504 which is connected electrically to an input terminal of the flip-flop 155.

Referring now to FIGS. 3, 4 and 5, in operation, the driving circuit (U) activates the first power transistor unit 400 so as to permit rotation of the rotatable shaft 521 (FIG. 2) at a predetermined initial speed when the power supplying circuit 100 is activated. The Hall sensors 602 begin to generate three speed pulses which represent the rotating speed of the shaft 521 and which are out of phase relative to each other. At this stage, two of the AND gates 901,902,903 output a low logic voltage intermittently such that two of the first power transistors 401,402,403 are activated and one of the first power transistors 401,402,403 is deactivated at any time. The frequency-to-voltage converter 110 generates an analog voltage signal corresponding to the rotating speed of the shaft 521. The variable-resistor of the speed setting unit 120 is adjusted so as to generate a reference voltage signal equal to a desired motor speed. The comparator 131 compares the reference voltage signal with the analog voltage signal and generates an analog error voltage signal having a magnitude corresponding to a difference between the analog voltage signal and the reference voltage signal. The adder 134 generates a voltage output equal to the sum of the error voltage and the reference voltage signal. The comparator 142 compares the voltage output with the triangular-wave voltage signal and generates pulse signals which permit one of the AND gates 904,905,906 to output the low logic voltage intermittently such that one of the second power transistors 451,452,453, which corresponds to the deactivated one of the first power transistors 401,402,403, is activated at any time. The activated two of the first power transistors 401,402,403 and the activated one of the second power transistors 451,452,453 cooperatively define a loop, thereby activating the dc motor 500 to cause the shaft 521 to rotate.

It should be noted that, if the amount of load current from the power supplying circuit 100 exceeds the predetermined value, the comparator 154 generates a high voltage output so as to reset the flip-flop 155. Resetting of the flip-flop 155 causes the diode 156 to conduct such that the voltage at the node (N) becomes equal to the ground voltage, thereby turning off all of the second power transistors 451,452,453 in order to deactivate the dc motor 500. On the other hand, if the temperature of the motor exceeds a predetermined value, the thermal switch 504 is activated so as to ground the node (N), thereby turning off all of the second power transistors 451,452,453 in order to deactivate the dc motor 500. Furthermore, a comparator 133 has an input terminal connected electrically to the output terminal of the buffer 132 and compares the error voltage signal with a predetermined voltage signal. If the difference between the error voltage signal and the predetermined voltage signal is too large, a flip-flop 135 is reset so as to cause the voltage at the node (N) to reach the ground voltage, thereby similarly deactivating the dc motor 500.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A motor assembly comprising a dc motor and a driving unit for driving said dc motor at different speeds, said motor including a stator and a rotor, said stator including a housing and a three-phase coil unit installed in said housing and provided with three windings, said rotor extending through said housing of said stator, wherein said driving unit includes:

a power supplying circuit for generating a dc output;

a first power transistor unit including three first power transistors, each of said first power transistors being activable to connect electrically a respective one of said windings of said coil unit and said power supplying circuit;

a driving circuit connected electrically to said power transistors of said first power transistor unit for activating said first power transistor unit when said power supplying circuit is activated;

a sensor circuit for sensing rotating speed of said rotor and for generating three speed pulses which represent said rotating speed of said rotor and which are out of phase;

a frequency-to-voltage converter connected electrically to said sensor circuit for generating an analog voltage signal corresponding to said rotating speed of said rotor;

a speed setting unit activable to generate a reference voltage signal equal to a desired motor speed;

a comparing unit connected electrically to said speed setting unit and said frequency-to-voltage converter for comparing said reference voltage signal with said analog voltage signal and for generating an analog error voltage signal having a magnitude corresponding to a difference between said analog voltage signal and said reference voltage signal;

a pulse width modulating circuit connected electrically to said comparing unit for generating a variable-width modulated pulse signal with said analog error voltage signal as a modulating signal; and a second power transistor unit including three second power transistors, each of said second power transistors corresponding to one of said first power transistors and being activable to connect electrically said power supplying circuit and a respective one of said windings of said coil unit;

said driving circuit receiving said three speed pulses from said sensor circuit and processing said speed pulses so as to activate intermittently said first power transistors such that two of said first power transistors are activated and one of said first power transistors is deactivated at any time;

said driving circuit being further connected electrically to said pulse width modulating circuit and said second power transistors for activating one of said second power transistors corresponding to deactivated one of said first power transistors upon receiving said modulated pulse signal from said pulse width modulating circuit.

2. A motor assembly as claimed in claim 1, further comprising a current detecting unit for detecting amount of load current from said power supplying circuit and for preventing said driving circuit from receiving said modulated pulse signal from said pulse width modulating circuit so as to turn off said one of said second power transistors corresponding to said deactivated one of said first power transistors in order to stop rotation of said rotor when said load current exceeds a predetermined value.

3. A motor assembly as claimed in claim 1, further comprising a temperature detecting unit for detecting temperature of said dc motor and for preventing said driving circuit from receiving said modulated pulse signal from said pulse width modulating circuit so as to turn off said one of said second power transistors corresponding to said deactivated one of said first power transistors in order to stop rotation of said rotor when temperature of said motor exceeds a predetermined value.

4. A motor assembly as claimed in claim 1, further comprising a comparator having an input terminal connected electrically to said comparing unit for comparing said analog error voltage signal with a predetermined voltage signal and for preventing said driving circuit from receiving said modulated pulse signal from said pulse width modulating circuit so as to turn off said one of said second power transistors corresponding to said deactivated one of said first power transistors in order to stop rotation of said rotor when said analog error voltage signal exceeds said predetermined voltage signal.

5. A motor assembly as claimed in claim 1, wherein said sensor circuit includes three angularly displaced Hall sensors which are provided adjacent to one end of said rotor.

6. A motor assembly as claimed in claim 1, wherein said rotor comprises a rotatable shaft extending rotatably through said housing of said stator, a magnet-mounting member sleeved securely on said rotatable shaft and formed with a plurality of axially extending magnet-receiving cavities around said rotatable shaft, and a plurality of permanent magnets received respectively in said magnet-receiving cavities.

\* \* \* \* \*